United States Patent [19]
Gautier et al.

[11] Patent Number: 4,718,324
[45] Date of Patent: Jan. 12, 1988

[54] SERVOMOTOR FOR ASSISTING WITH BRAKING INCORPORATING A SWITCH FOR A STOP SIGNAL

[75] Inventors: Jean-Pierre Gautier, Aulnay-sous-Bois; Jean-Louis Penigault, Paris, both of France

[73] Assignee: Bendix France S.A., Paris, France

[21] Appl. No.: 851,595

[22] Filed: Apr. 14, 1986

[30] Foreign Application Priority Data

Apr. 17, 1985 [FR] France .................... 85 05811

[51] Int. Cl.⁴ .................... F01B 25/26; F15B 9/10
[52] U.S. Cl. .................... 91/1; 91/376 R; 340/52 B; 200/61.86; 200/61.89
[58] Field of Search .................... 91/376 R, 1; 137/554; 340/52 B, 69, 71; 200/61.86, 61.89, 83 Q; 60/534, 545

[56] References Cited

U.S. PATENT DOCUMENTS

| | | | |
|---|---|---|---|
| 3,257,522 | 6/1966 | Raab | 200/61.89 |
| 3,293,849 | 12/1966 | Smith | 60/54.5 |
| 3,794,147 | 2/1974 | Shellhause | 200/61.89 X |
| 4,365,538 | 12/1982 | Andoh | 91/1 |
| 4,629,842 | 12/1986 | Picot et al. | 200/61.89 X |

FOREIGN PATENT DOCUMENTS

3226579 12/1983 Fed. Rep. of Germany .

Primary Examiner—Robert E. Garrett
Assistant Examiner—Mark A. Williamson
Attorney, Agent, or Firm—Larry J. Palguta; Ken C. Decker

[57] ABSTRACT

The servomotor, of the type incorporating an abutment component (7, 70) which is mounted on the input rod (6) and which cooperates in bearing, in the rest position of the servomotor, against a stop structure (9, 12) which is firmly fixed to the casing, incorporates in the stop structure an electrical contact mechanism (13, 15) which is capable of being actuated by the abutment component (7, 70) and which advantageously incorporates and actuating portion (17) which is interposed between the abutment component (7, 70) and an internal bearing surface (20) of an end collar portion (12) of the stop structure which carries the fixed electrical contacts (13).

7 Claims, 2 Drawing Figures

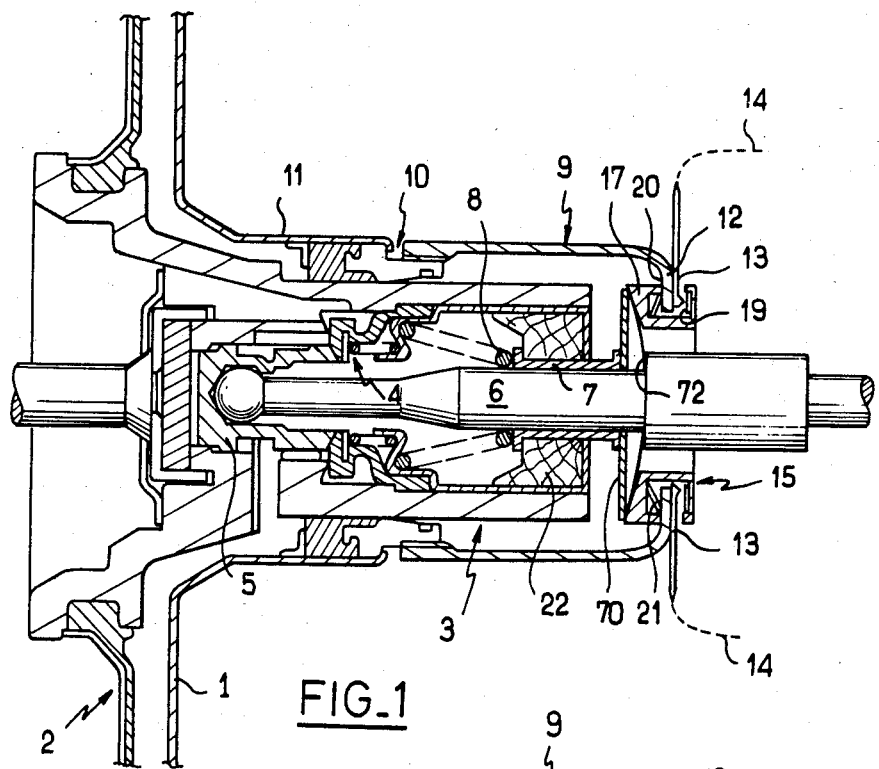
FIG_1
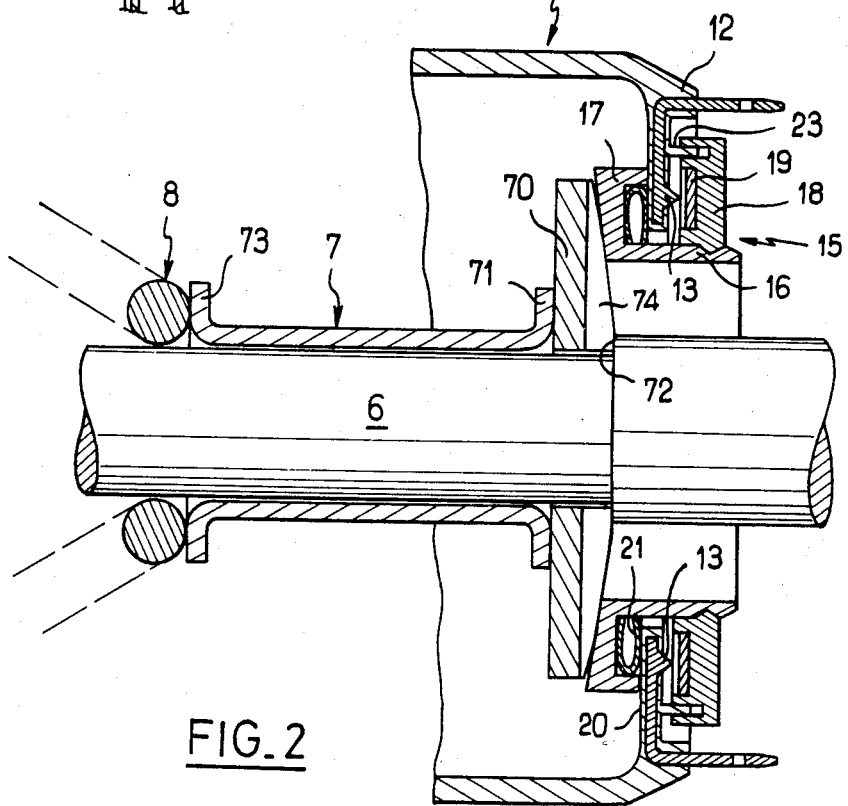
FIG_2

SERVOMOTOR FOR ASSISTING WITH BRAKING INCORPORATING A SWITCH FOR A STOP SIGNAL

The present invention concerns servomotors for assisting with braking of the type incorporating, in a casing, a piston structure enclosing a valve means which is actuated by an input rod supporting an abutment component which cooperates in bearing, in the rest position of the servomotor, with a stop structure which is firmly fixed to the casing, and which is able to move with the input rod during operation of the servomotor.

A servomotor of this type is described in the document U.S. Pat. No. 4,227,371, and also in European patent application N.85,400,483 in the name of the Applicant Company. In conventional assistance servomotors, of the type in which the piston structure comes to bear, in the rest position of the servomotor, directly against the rear shell of the casing, it is possible to arrange, in this rear shell of the casing, a stop switch which is actuated directly by the piston structure, as described in the document FR No. 2,476,577. In addition to the fact that this stop switch arrangement raises sealing problems and can lead to problems of wear in the region of the membrane of the piston structure, in servomotors of the type defined above, with reduced operational dead travel, the rest position of the servomotor is defined by the abutment component on the input rod coming into abutment against the stop structure which is firmly fixed to the casing. In these conditions, the rest position of the piston structure is no longer defined accurately relative to the casing and the known arrangement of a stop switch in the rear shell of the casing so as to cooperate with the piston structure is no longer suitable, owing to the additional travel which must then be provided for the stop switch.

The aim of the present invention is to propose a stop switch arrangement for a servomotor of the type defined above in an arrangement which is simple, robust, whose cost of manufacture is low and whose operation is accurate and reliable.

To achieve this, according to a characteristic of the invention, the servomotor incorporates an electrical contact means which is mounted on the stop structure and which is capable of being actuated by the abutment component carried on the input rod.

According to a particular characteristic of the invention, the electrical contact means carries an electrical contact component which is movable relative to the stop structure and which cooperates in engagement, typically in bearing, with the abutment component supported by the input rod.

With such an arrangement, the stop switch responds directly to the movement of the input rod from its rest position irrespective of the method adopted to determine this rest position in situ.

Other characteristics and advantages of the present invention will emerge from the following description of an embodiment which is given by way of illustration but is not limiting in any way, with reference to the accompanying drawings, in which:

FIG. 1 is a diagrammatic view in longitudinal section of the rear central portion of a pneumatic assistance servomotor according to the invention; and FIG. 2 is a diagrammatic view in partial longitudinal section at a larger scale of the stop switch arrangement of the servomotor shown in FIG. 1.

FIG. 1 shows a portion of the rear shell 1 of the casing of a servomotor for assisting with braking of the vacuum type, and the casing encloses a piston structure, given the general reference 2, which incorporates a rear hub portion of reduced diameter 3 which encloses a distribution valve means 4 which is actuated, by a valve plunger 5, by an input rod 6 whose outer end is typically connected to a brake pedal (not shown) of a vehicle. The servomotor shown in FIG. 1 is of the type described in European Application No. 85,400,483 mentioned above and incorporates, a sleeve 7 which is mounted so as to slide on the input rod 6 and which is pushed elastically in the direction away from the plunger 5 by a return spring 8 which bears against the support frame of the valve means 4 and is intended to cooperate in bearing with a stop structure, given the general reference 9, which is firmly fixed to the casing shell 1 and is typically formed by a tubular sleeve or rigid cap which is attached to an annular assembly 10 for guiding and for sealing the hub 3 which is mounted in a rear tubular extension or neck 11 of the rear shell 1.

As shown more clearly in FIG. 2, the sleeve 9 incorporates, remote from the annular assembly 10, an annular end collar portion 12 which extends radially inwards through which the input rod 6 passes. In the end collar portion 12, diametrically opposite for example, two fixed metal electrical contacts 13 are arranged which project partially towards the rear of the collar 12 and are intended to be interposed in an electrical circuit for stop lamps 14. In the embodiment shown, in the end collar portion 12 a movable tubular electrical contact assembly is mounted so as to slide which is given the general reference 15 and which incorporates an internal sleeve portion 16 lying around the input rod 6, an actuating portion 17 which is situated, in the embodiment shown, inside the sleeve 9, and an outer contact support portion 18 in which an annular metal washer 19 is mounted which is capable of coming to bear against the fixed electrical contacts 13 so as to close the electrical circuit 14.

In the embodiment shown, a disc 70 is connected to the sleeve 7, the disc 70 also being mounted so as to slide freely on the input rod 6 and being interposed between an end collar 71 of the sleeve 7 and a shoulder 72 formed by a portion of greater thickness of the input rod 6. The sleeve 7 incorporates at its end remote from the disc 70, another end collar 73 against which the spring 8 bears, which thus pushes the sleeve assembly 7 and the disc 70 in the direction towards the shoulder 72. As shown clearly in FIG. 2, the actuating portion 17 of the assembly 16 is arranged in such a way as to be interposed between the rear surface of the disc 70 and the inner bearing surface 20 formed by the end collar portion 12 of the sleeve 9. A separating spring 21 is arranged in the actuating portion 17 so as to bear against the bearing surface 20 in order to push the tubular assembly 16 in the direction towards the valve plunger 5, that is to say in the direction tending to bring the metal washer 19 into contact with the fixed electrical contacts 13.

In the rest position of the servomotor shown in FIGS. 1 and 2, the valve plunger 5 is in a position relative to the hub 3 such that the valve means 4 is in contact with its two seats, the abutment component 7, 70, pushed by the spring 8, bearing against the bearing surface 20 via the actuating portion 17, that is to say in a configuration in which, the spring 21 being weaker than the spring 8, the electrical circuit is open. When the input rod 6 is pushed so as to operate the servomotor, the disc 70 is positioned so as to bear against the shoulder 72 of the input rod 6 and any further movement of the latter thus causes movement of the disc 70 away from the bearing surface 20, thus allowing the assembly 16 to move to the left, in the drawings, so as to bring the annular washer 19 very rapidly to close the circuit 14. When the servomotor ceases to be operated, the movable assembly regains the position shown in FIGS. 1 and 2, that is to say with the disc 70 pushing back the actuating portion 17 of the assembly 16 against the bearing surface 20 against the separating spring 21, thus opening the circuit 14.

In the embodiment shown, in order to take into account possible slight misalignment between the input rod 6 and the sleeve 9 the disc 70 has a convex rear surface forming a first external bearing surface which cooperates with the actuating portion 17 and a second central bearing surface which cooperates with the shoulder 72, this convex rear surface incorporating radial ribs 74 so as to allow atmospheric air to reach freely the valve means 4 via the air filter 22 which is situated in the hub 3 around the sleeve 7. To facilitate the centered sliding of the tubular assembly 16 relatively to the end collar portion 12, an annular guiding projection 23 may be provided on the latter which cooperates with a corresponding housing of the rear contact support portion 18. This annular projection 23 also provides protection of the electrical contacts against the intrusion of contaminating agents.

Although the present invention is described above in relation to a particular embodiment, the invention is not limited by it but on the contrary is capable of modifications and variants which will be apparent to a person versed in the art. In particular, instead of providing electrical contacts which are normally open at rest, reversed electrical contacts which are normally closed at rest may be provided on the end collar portion 12 and in the tubular assembly 16, which open when the assembly 16 moves so as to follow the movement of the disc 70. In the latter case, the disc 70 may be used directly as a movable electrical contact. As a variant, a switch in vacuo of the "reed" type may be provided in the end collar portion 12 which cooperates with a permanent magnet carried by the disc 70 or moved by the latter.

We claim:

1. A servomotor for assisting with braking comprising, in a casing, a piston structure enclosing valve means actuated by an input rod supporting an abutment component which cooperates in bearing, in a rest position of the servomotor, with a stop structure fixed firmly to the casing, the abutment component movable with the input rod during operation of the servomotor, characterized in that the servomotor includes electrical contact means mounted on the stop structure and capable of being actuated by the abutment component, the electrical contact means including an electrical contact component movable relative to the stop structure and which cooperates in engagement with the abutment component, the stop structure comprising a collar portion of a sleeve extending from the casing, the collar portion forming an internal bearing surface and supporting the electrical contact component, the movable electrical contact component including an actuating portion interposed between the abutment component and the internal bearing surface of the stop structure, the abutment component mounted slidable on the input rod and including at least one bearing surface which cooperates with the actuating portion so that upon release of the input rod the first bearing surface engages the actuating portion which displaces the contact component to effect operation thereof.

2. The servomotor according to claim 1, characterized in that the servomotor incorporates a spring situated between the stop structure and the movable electrical contact component and which pushes the contact component in a direction toward the abutment component.

3. The servomotor according to claim 2, characterized in that the movable electrical contact component is mounted so as to slide relative to the collar portion and includes a metal contact component arranged to be displaced into engagement with two fixed electrical contact components.

4. The servomotor according to claim 3, characterized in that the spring is held in the actuating portion, the fixed electrical contact components disposed at an opposite axial position from the internal bearing surface.

5. The servomotor according to claim 1, characterized in that the abutment component includes a second bearing surface which cooperates with a shoulder of the input rod.

6. The servomotor according to claim 5, characterized in that the abutment component includes a cylindrical sleeve portion and a separate collar part, the collar part defining the first and second bearing surfaces.

7. The servomotor according to claim 6, characterized in that the collar part includes a ribbed surface with a convex external profile forming the first and second bearing surfaces.

* * * * *